United States Patent
Zlateff et al.

(10) Patent No.: US 7,433,700 B2
(45) Date of Patent: Oct. 7, 2008

(54) STRATEGIES FOR PEER-TO-PEER INSTANT MESSAGING

(75) Inventors: Carmen Zlateff, Kirkland, WA (US); John S. Holmes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 10/987,396

(22) Filed: Nov. 12, 2004

(65) Prior Publication Data

US 2006/0173960 A1    Aug. 3, 2006

(51) Int. Cl.
*H04Q 7/20*    (2006.01)
(52) U.S. Cl. .................... 455/466; 455/41.2; 455/41.3; 455/450; 455/451; 455/452.2; 455/455; 455/464; 370/328; 370/338
(58) Field of Classification Search ................. 370/329, 370/338, 341, 352–357, 328; 455/450–453, 455/466, 41.2, 41.3, 455, 464; 715/758
See application file for complete search history.

(56) References Cited

U.S. PATENT DOCUMENTS

| | | | |
|---|---|---|---|
| 6,252,588 B1 | 6/2001 | Dawson | |
| 6,292,880 B1 | 9/2001 | Mattis et al. | |
| 6,535,867 B1 | 3/2003 | Waters | |
| 6,594,665 B1 | 7/2003 | Sowa et al. | |
| 6,629,793 B1 | 10/2003 | Miller | |
| 6,813,690 B1 | 11/2004 | Lango et al. | |
| 7,013,327 B1 | 3/2006 | Hickman et al. | |
| 7,080,139 B1 | 7/2006 | Briggs et al. | |
| 7,127,613 B2 * | 10/2006 | Pabla et al. ................. 713/171 |
| 7,171,415 B2 | 1/2007 | Kan et al. | |
| 7,203,356 B2 | 4/2007 | Gokturk et al. | |
| 7,353,253 B1 | 4/2008 | Zhao | |
| 2002/0010746 A1 | 1/2002 | Jilk, Jr. et al. | |
| 2002/0036990 A1 | 3/2002 | Chodor et al. | |
| 2002/0065931 A1 | 5/2002 | Goodwin, III et al. | |
| 2002/0077135 A1 | 6/2002 | Hyon | |
| 2002/0107925 A1 | 8/2002 | Goldschneider et al. | |
| 2002/0184311 A1 | 12/2002 | Traversat et al. | |
| 2002/0194006 A1 | 12/2002 | Challapali | |
| 2003/0065721 A1 | 4/2003 | Roskind | |
| 2003/0131098 A1 | 7/2003 | Huntington et al. | |
| 2003/0177184 A1 * | 9/2003 | Dickerman et al. ......... 709/204 |

(Continued)

FOREIGN PATENT DOCUMENTS

WO    WO-0193503    * 12/2001

OTHER PUBLICATIONS

AOL Instant Messenger homepage, provided by America Online of Dulles, VA, available at <<http://www.aim.com/>>, accessed on Nov. 8, 2005, 1 page.

(Continued)

*Primary Examiner*—Stephen M D'Agosta
(74) *Attorney, Agent, or Firm*—Lee & Hayes, PLLC

(57) ABSTRACT

Strategies are described for establishing a peer-to-peer (P2P) direct coupling channel between two user devices at the commencement of an Instant Messaging (IM) conversation. Provisions are described for gracefully switching to a switchboard coupling channel when the conversation includes more than two participants, and switching back to the P2P coupling channel if the conversation again is restored to two participants (providing that the P2P coupling channel is still active when the conversation is restored to two participants).

22 Claims, 10 Drawing Sheets

U.S. PATENT DOCUMENTS

| | | | |
|---|---|---|---|
| 2003/0208543 A1* | 11/2003 | Enete et al. | 709/206 |
| 2004/0018858 A1 | 1/2004 | Nelson | |
| 2004/0070567 A1 | 4/2004 | Longe et al. | |
| 2004/0098502 A1 | 5/2004 | Xu et al. | |
| 2004/0153517 A1 | 8/2004 | Gang et al. | |
| 2005/0004993 A1 | 1/2005 | Miller et al. | |
| 2005/0027839 A1 | 2/2005 | Day et al. | |
| 2006/0015560 A1 | 1/2006 | MacAuley et al. | |

OTHER PUBLICATIONS

MSN Messenger homepage, provided by Microsoft Corporation of Redmond, WA, available at <<http://messenger.msn.com/Xp/Default.aspx>>, accessed on Nov. 8, 2005, 2 pages.

Yahoo! Messenger homepage, provided by Yahoo! of Sunnyvale, CA, available at <<http://messenger.yahoo.com/?ovchn=GGL&ovcpn=US_Can_Branded-Generic&ovcrn=yahoo+messenger&ovtac=PPC>>, accessed on Nov. 8, 2005, 2 pages.

Borg, "Yahoo Messenger 5.5 Hidden Smileys", retrieved Jun. 7, 2008 at <<http://www.eeggs.com/items/36761.html>>, The Easter Egg Archive, Version 5.5, pp. 1-2.

Borger, et al, "IP over SCI", IEEE, 2000, pp. 73-77.

Copeland, "E-mail's Signature Smiley Face is Long in the Tooth", Pittsburgh Tribune Review, Sep. 20, 2002, pp. 1-3.

"Must Read: Signature/Avatar Rules", retrieved Jun. 7, 2008 at <<http://web.archive.org/web/20031002014646/forums.allalias.com/index.php>>, AllAlias.com, May 23, 2003, pp. 1-8.

"Smiley Emoticons", retrieved Jun. 7, 2008 at <<http://www.ultimatemetal.com/forum/power-omens/46652-smiley-emoticons.html>>, Ultimate Metal Forum, Sep. 5, 2002, pp. 1-9.

"Trillian Emoticons", retrieved Jun. 8, 2008 at <<http://www.bigblueball.com/forums/trillian/14101-trillian-emoticons.html>>, BigBlueBall Forums, pp. 1-6.

"Yahoo! Emoticons for Yahoo Messenger & Java Chat Applet" retrieved Jun. 7, 2008 at <<http://syntetica.eng.uci.edu/>>, Synthetica, pp. 1-7.

* cited by examiner

STRATEGIES FOR PEER-TO-PEER INSTANT MESSAGING

REFERENCE TO COPENDING APPLICATIONS

This application is related to copending and commonly assigned U.S. patent application Ser. No. 10/611,575 (the '575 application), entitled, "Transport System for Instant Messaging," filed on Jul. 1, 2003, and naming John S. Holmes et al. as inventors. The '575 application is incorporated by reference herein in its entirety.

TECHNICAL FIELD

This subject matter relates to strategies for conducting an instant messaging communication session. In a more particular implementation, this subject matter relates to strategies for conducting an instant messaging communication session using peer-to-peer coupling among participants of the conversation.

BACKGROUND

Instant messaging (IM) systems have enjoyed significant popularity since their introduction. By way of overview, IM systems are generally designed to enable real-time communication among participants who use electronic devices (typically, personal computer devices) to send and receive IM messages. An IM system typically includes functionality for allowing an IM user to define a group of participants with whom the user frequently communicates. The IM system will then typically notify the IM user when any member of the thus-defined group happens to be on-line. The IM user then has the option of starting a communication session with one or more of the group members. This prompts the IM system to open a user interface (UI) panel that will display an evolving sequence of textual messages transmitted among group members. IM systems also typically allow users to communicate with group members by sending other kinds of information, such as files, images, audio information, and so forth.

FIG. 1 shows a broad overview of a conventional instant messaging system 100. In this system 100, a device A 102 and device B 104 use instant-messaging functionality to communicate with each other via a coupling mechanism 106 (typically, in part, the Internet). In this conventional configuration, to establish a communication session, the system provides set-up functionality (not shown) that connects device A 102 and device B 104 to a switchboard 108. The switchboard 108 thereafter serves the role routing instant messages (IM's) 110 between the user devices (102, 104). Additional users can join the session, whereupon the switchboard 108 then serves the role of routing IM messages 110 generated by any participant of the conversation to all of the other participants.

While the system 100 shown in FIG. 1 has proven to be a feasible solution to implementing instant messaging, it does suffer from certain drawbacks. First, the growing popularity of instant messaging may impose a significant processing burden on the switchboard 108. More specifically, the switchboard is typically implemented as one or more server-type computers. The large processing load imposed by IM traffic can consume a large amount of the server's resources. The IM users may experience delays in service as result of such consumption of server resources.

Second, the use of the switchboard can be inefficient, particularly in those cases where the participants of a conversation are physically located in close proximity to each other (possibly within the same corporation and behind the same firewall), yet the switchboard 108 is housed at a location which is remote from all of the participants. For instance, consider the case where two IM users who are employees of Microsoft Research in China wish to communicate with each other via an IM service which houses its switchboards 108 in San Jose, Calif. Routing IM messages via the switchboard 108 in these circumstances may introduce unnecessary overhead to the IM transaction, which may manifest itself in delays in the communication session.

Third, the use of the switchboard 108 mandates an indirect routing scheme that may be the source of errors in IM message transmission. This may result in dropped (i.e., lost) IM messages.

The above-referenced '575 application provides an exemplary solution to some of the above problems by providing a mechanism for directly transmitting files from one IM participant to another without routing the files through the switchboard 108. The '575 application further describes a mechanism for intelligently selecting an optimal communication strategy to transfer information from one user device to another. Nevertheless, there is room for improvement to the direct transfer strategies described in the '575 application.

For at least the above-identified reasons, there is an exemplary need for more satisfactory strategies for transmitting instant messages among participants of an instant messaging conversation.

SUMMARY

According to one exemplary implementation, a method is described for transmitting IM information to participants of an instant messaging system, comprising: (a) commencing a conversation between a first user and a second user; (b) automatically establishing, in response to the commencing, a direct coupling channel between the first user and the second user; and (c) conducting the exchange of IM information between the first user and the second user using the direct coupling channel.

According to another exemplary feature, the commencing of the conversation between the first user and the second user involves establishing a preparatory switchboard coupling channel between the first user and the second user.

According to another exemplary alternative feature, the commencing of the conversation between the first user and the second user does not involve establishing a preparatory switchboard coupling channel between the first user and the second user.

According to another exemplary feature, the establishing of the direct coupling channel involves selecting a transport handler for implementing the direct coupling channel that meets prescribed criteria.

According to another exemplary feature, the selecting of the transport handler involves computing a score for each of a plurality of transport handlers based on plural criteria, and selecting a transport handler having the best score.

According to another exemplary feature, the establishing of the direct coupling channel between the first user and the second user involves querying an echo server to determine the nature of any intermediary functionality involved in the direct coupling of the IM information between the first user and the second user.

According to another exemplary feature, the establishing of the direct coupling channel between the first user and the second user involves performing mutual authentication in which the first user performs authentication with respect to the second user, and the second user performs authentication with respect to the first user.

According to another exemplary feature, the IM information includes at least textual IM messages.

According to another exemplary feature, the method further includes: (d) adding at least a third user to the conversation; and (e) switching from the direct coupling channel to a switchboard coupling channel, wherein the switchboard coupling channel provides a means for communicatively coupling the first user, the second user and the third user.

According to another exemplary feature, the switching from the direct coupling channel to the switchboard coupling channel involves establishing the switchboard coupling channel if the switchboard coupling channel is not active at the time that the third user joins the conversation.

According to another exemplary feature, the switching from the direct coupling channel to the switchboard coupling channel involves using an existing switchboard coupling channel if there is such an existing switchboard coupling channel at the time that the third user joins the conversation.

According to another exemplary feature, the method further includes: (f) removing at least one participant to the conversation, again leaving only two users in the conversation; and (g) switching from the switchboard coupling channel to the direct coupling channel if the direct coupling channel remains active when the participant is removed, and maintaining the use of the switchboard coupling channel if the direct coupling channel has been de-activated when the participant is removed.

According to another exemplary feature, the method further includes the use of acknowledgement messages transmitted between the first user and the second user to assess the state of the direct coupling channel.

According to another exemplary feature, the method includes using an offline information transmission route to send the IM information between the first user and the second user in the event that the use of the acknowledgement messages reveals that there has been a failure in the direct coupling channel between the first user and the second user.

Additional exemplary implementations are described in the following.

Figure 1:
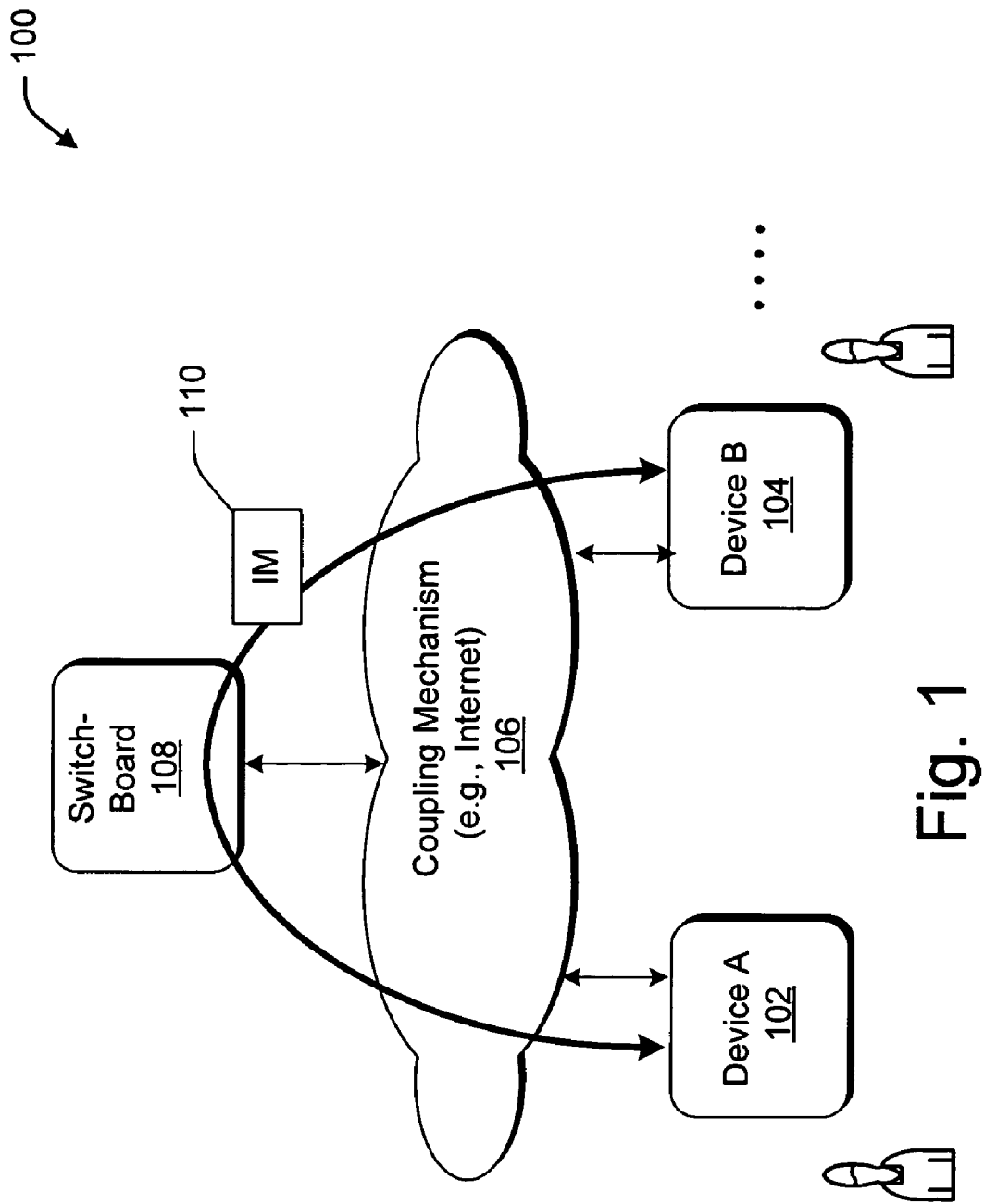
FIG. 1 shows a conventional system that uses a switchboard coupling channel to convey IM information between participants of an IM conversation.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth strategies for transmitting instant messages among users of an instant messaging system in direct fashion. In the context of the present application, "direct fashion" means that, in the exemplary context of two users, IM information is transmitted directly from a first user to the second user without being routed through the intermediary agent of a switchboard. In a first implementation, the mechanism used to achieve this direct transmission initially sets up a direct coupling channel between two users using a switchboard coupling channel. In a second implementation, the mechanism used to achieve direct transmission sets ups the direct coupling channel without the use of a switchboard coupling channel.

According to another exemplary feature, the strategies described herein provide a protocol and corresponding mechanism for automatically setting up the direct coupling channel immediately after the first user establishes a conversation with the second user. The mechanism is automatic in the sense that the setup does not necessarily involve expressly querying any of the participants to determine whether they wish to set up the direct coupling channel.

According to another exemplary feature, the strategies described herein provide a protocol and corresponding mechanism for gracefully transitioning between use of the direct coupling channel and the use of a switchboard coupling channel. For instance, in an exemplary implementation, when the first user opens a conversation to communicate with the second user, the mechanism will immediately establish a direct coupling channel between the first user and the second user (providing that the first user and the second user have previously permitted such direct connection, and the IM infrastructure can accommodate such a direct connection). But when a third user joins, the mechanism will revert to a switchboard mode of routing IM information to the users. This will involve re-establishing the switchboard coupling channel in the event that this channel has been shut down. On the other hand, when a user drops out of the group conversation, leaving only two users once again, the mechanism will switch back to the direct coupling channel if it is still available. However, if the direct coupling channel has been shut down, then the mechanism will continue to conduct the conversation among the two remaining users using the switchboard coupling channel.

According to another feature, the strategies described herein provide a mechanism for providing end-to-end authentication, in which the first user involved in a direct connection is tasked with the responsibility of providing authentication vis-à-vis the second user, and the second user is tasked with the responsibility of providing authentication vis-à-vis the first user.

According to another feature, the strategies described herein provide a mechanism that allows for the transmission of acknowledgement messages between the participants of a conversation to ensure that the coupling channels are working properly. In the event that real-time communication channels fail, the mechanism can transmit any IM information through alternative off-line transmission routes, such as conventional E-mail.

According to another feature, the strategies described herein provide a mechanism for setting up an optimal transport handler that is used to implement the direct coupling channel between the first user and the second user. This mechanism can involve selecting a transport handler that best satisfies a defined set of criteria. More specifically, the mechanism can assign a score to different transport handlers depending on their suitability vis-à-vis the criteria, and then can select the transport handler with the highest score. Such a selection mechanism can involve the exchange of various control information between participants of a conversation to establish the optimal transport handler. A user device can rely on an echo server to determine the identity of any intermediary functionality (such as network address translators, firewalls, etc.) in the communication pathway that couples the user device to other participants in the conversation. Information gleaned from the echo server can provide one criterion used to select the optimal transport handler for a given communication session.

The strategies described herein confer a number of benefits. According to one benefit, the use of a direct coupling channel to transmit IM information among users reduces the load imposed on the servers which implement the switchboard.

According to another benefit, the use of the direct coupling channel provides a more efficient routing strategy to send IM information among users, particularly where the users are located in close geographic proximity to one another.

According to another benefit, the use of the direct coupling channel has the potential to reduce errors that occur in routing IM information among users, and thus has the potential of reducing the number of lost IM messages.

According to another benefit, the provision whereby the direct coupling channel is automatically set up upon when a conversation is first established provides an efficient means for conducting peer-to-peer communication, as it allows for quicker use of the direct coupling channel.

According to another benefit, the use of mechanism for gracefully transitioning between the direct coupling channel and the switchboard coupling channel provides a business-savvy approach to implementing an instant messaging system. Empirically, the number of conversations involving only two users far exceeds the number of conversations involving more than two users. Accordingly, by immediately providing peer-to-peer coupling between two users as the coupling channel of choice, an instant messaging system can eliminate a significant workload placed on its switchboard servers, without necessarily having to adopt the potentially more complex routing mechanism that can also accommodate peer-to-peer coupling among more than two participants. Alternatively, the strategies described herein provide a useful intermediary solution for a system that will eventually provide direct peer-to-peer coupling among users, no matter how many users are involved.

Additional features and attendant benefits of the strategies will be set forth in this description.

As to terminology, the term "instant messaging" (IM) refers to any strategy for allowing users to transmit IM information among themselves in real-time fashion. The term "IM system" refers to any system or infrastructure which implements an IM strategy.

The term "IM information" refers to any kind of information that can be transmitted among users of an IM system. The mainstay of IM systems is their ability to transmit textual IM messages among users in real-time fashion via appropriately configured conversation user interface (UI) panels. The term "IM messages" will generally refer to such textual messages. In addition, instant messaging systems allow users to transmit various other information among themselves, such as files, images, custom tiles, and so forth. The term "IM information" also encompasses all such pieces of supplemental information.

As mentioned above, the term "direct coupling" (or synonymously, "peer-to-peer" coupling) refers to any kind of coupling strategy that allows a first user to directly transmit information to a second user without the use a switchboard. Peer-to-peer coupling is also referred to by its traditional acronym, P2P.

The terms "user" refers to any participant of an IM conversation. Typically, users will have established, in advance, a group of other users ("buddies") with whom they wish to communicate. As will be set forth, the mechanisms described herein permit users to define, in advance, whether they wish to selectively enable the direct coupling feature with respect to other members in their group.

This disclosure includes the following sections. Section A presents exemplary systems for transmitting messages among the users of an IM system using direct coupling. Section B presents a series of flowcharts which describe the operation of the systems of Section A. Section C describes an exemplary computer environment for implementing aspects of the systems of Section A.

A. Exemplary System

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of the IM Systems

Figure 2:
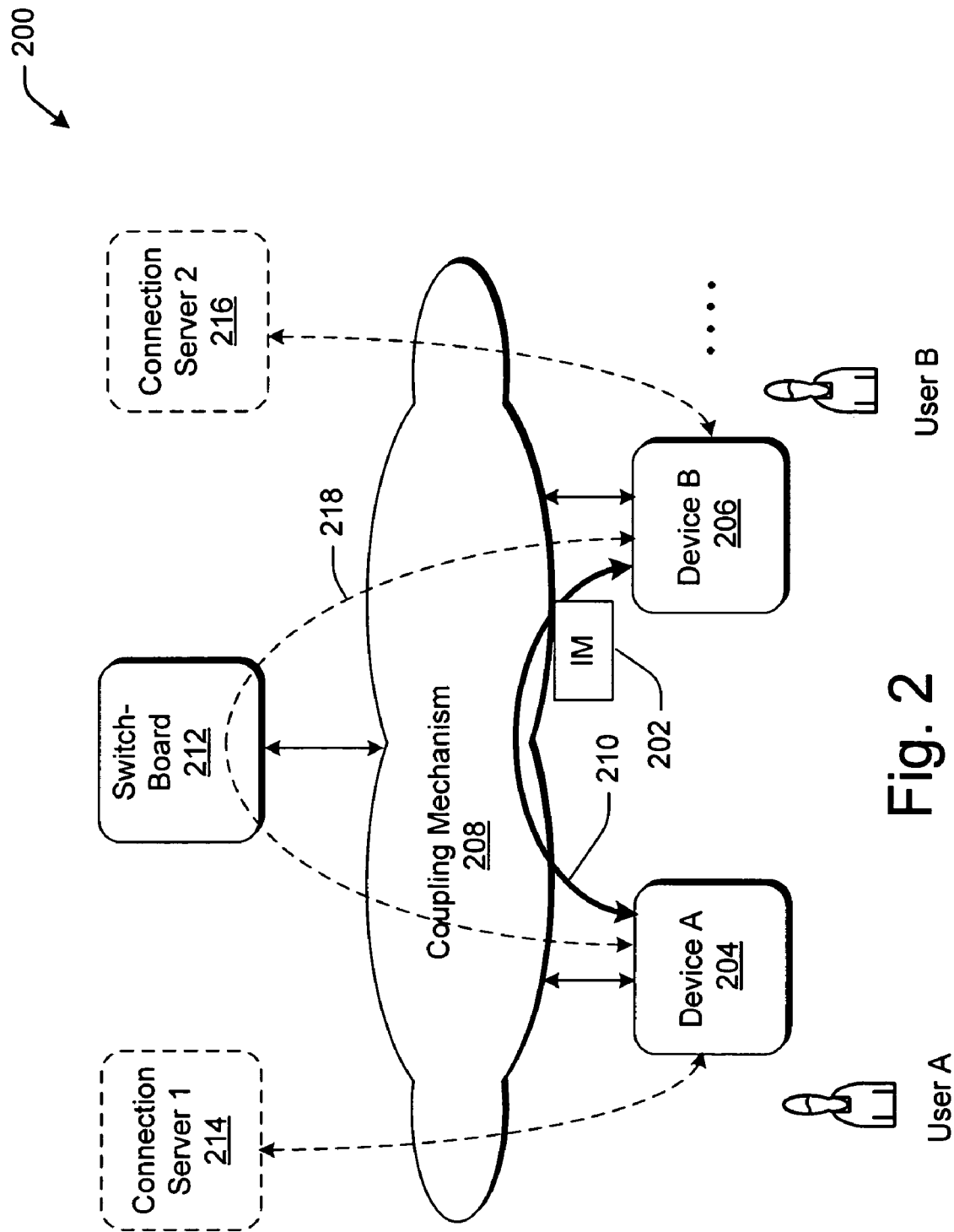
FIG. 2 shows a system that uses a direct coupling channel to convey IM information between users of an IM conversation, in which a switchboard plays a preparatory role in setting up the direct coupling channel.

FIG. 2 shows an exemplary system 200 for transmitting IM information 202 between user device A 204 and user device B 206 via a coupling mechanism 208 using a direct coupling channel 210. The direct coupling channel enables peer-to-peer communication between user A and user B, without requiring the transmission of the IM information 202 via a switchboard 212. However, in the implementation of FIG. 2, the system 200 does use the switchboard 212 to help establish the direct coupling channel 210.

Figure 3:
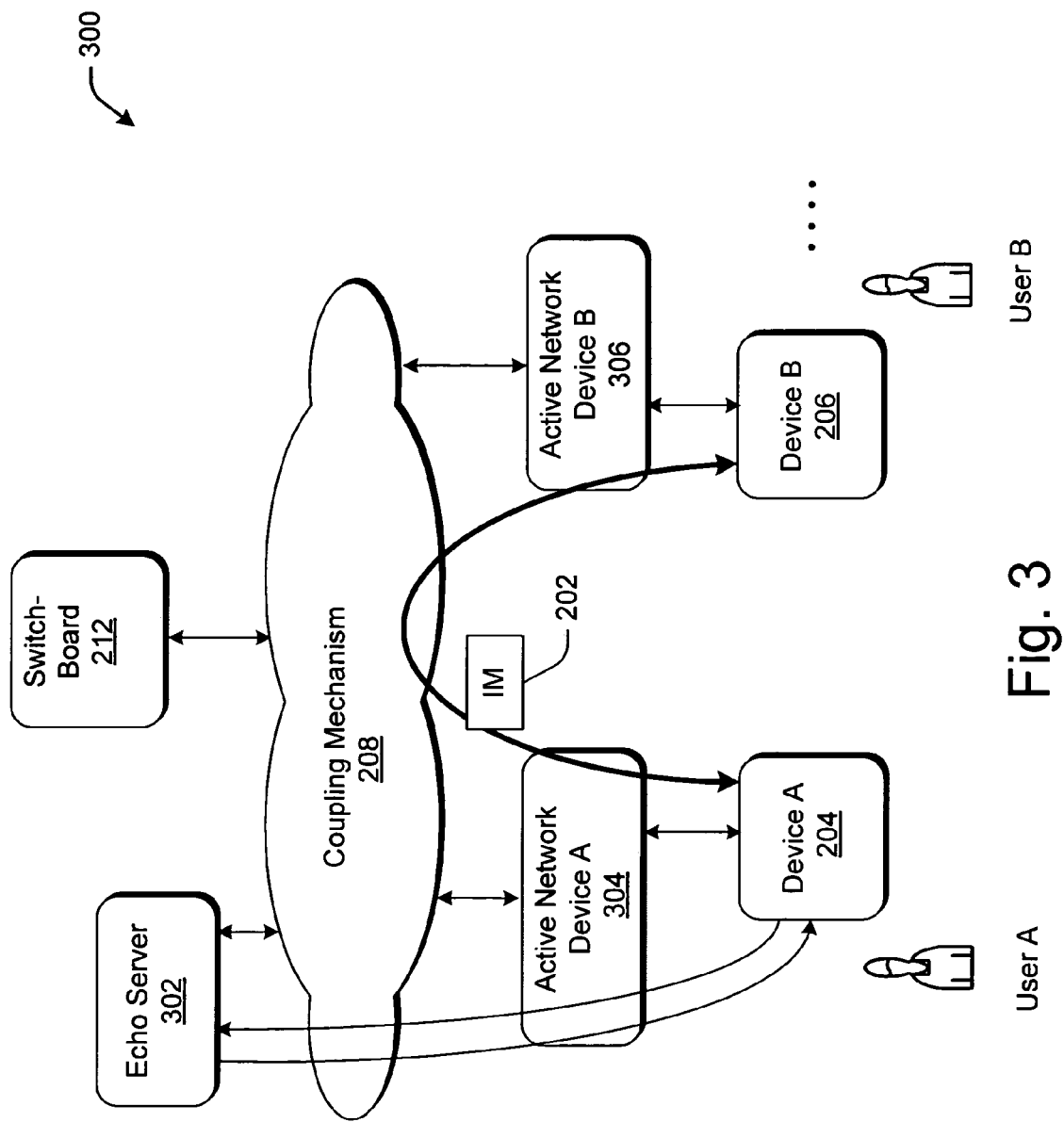
FIG. 3 shows a variation of the system of FIG. 2 in which an echo server is used to determine the nature of intermediary network functionality in the communication path that couples a first user device to a second user device.
Figure 4:
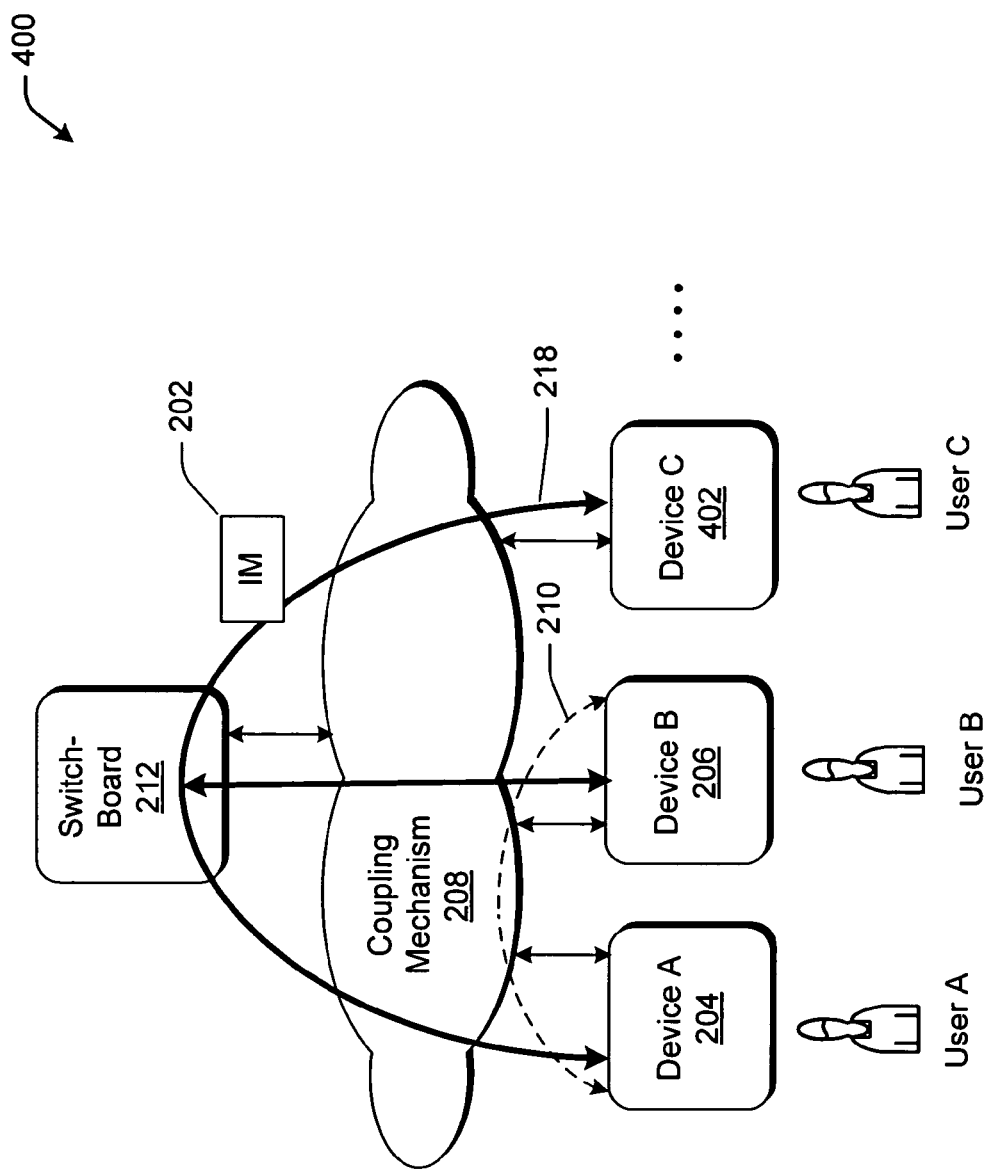
FIG. 4 shows a system that falls back on the use of a switchboard coupling channel when more than two users join a conversation.
Figure 5:
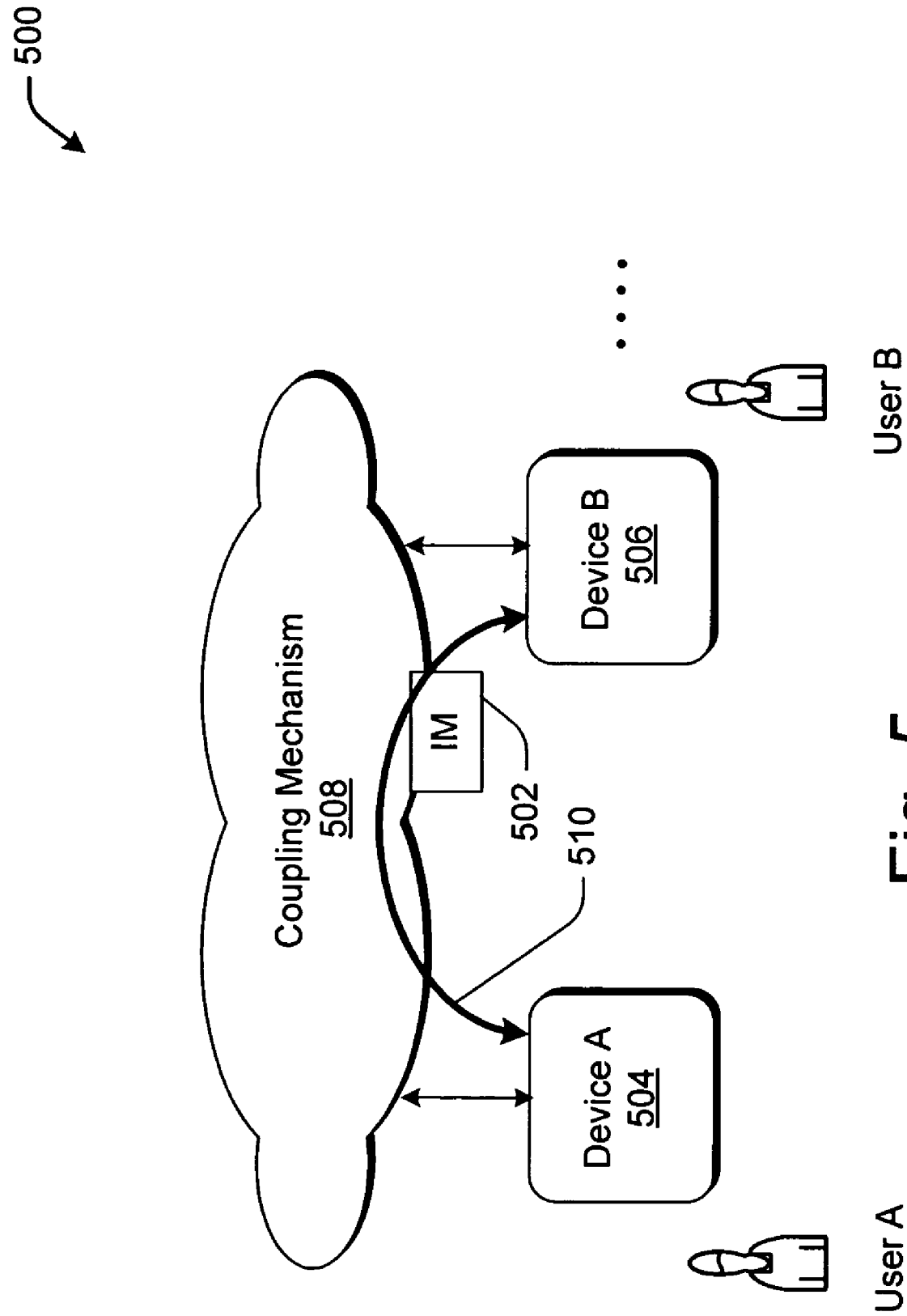
FIG. 5 shows a system that uses a direct coupling channel to convey IM information between users of an IM conversation, in which a switchboard does not play a preparatory role in setting up the direct coupling channel.

Each of the principal components of FIG. 2 will be fully explicated below. FIGS. 3-5 will then be explained, which present features that can be added to the system 200 of FIG. 2, or variations to the design of the system 200. Section B will then explore the procedural aspects of the systems shown in FIGS. 2-5 in greater detail.

Figure 6:
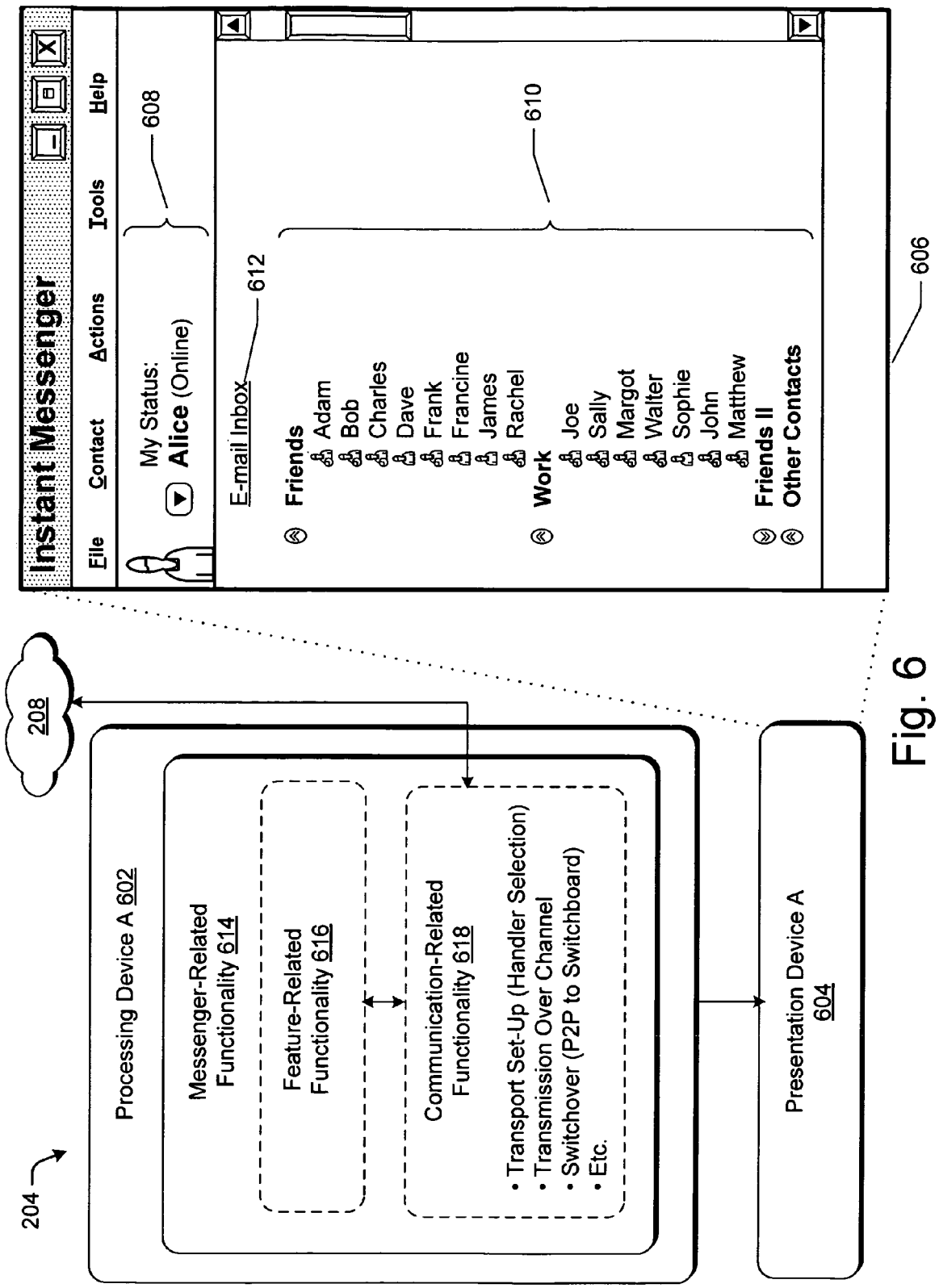
FIG. 6 shows an exemplary composition of a user device having messenger-related functionality for use in the systems of FIGS. 2-5.

To begin with, the user devices (204, 206) represent merely two exemplary user devices that can be used by respective users (e.g., user A and user B) to take part in the IM services provided by the system 200. Typically, the system 200 will accommodate any number of users, and, at any one time, can be tasked with the responsibility of servicing many thousands of users. The user devices (204, 206) can generally comprise any type of processing devices for sending and/or receiving messages. The user devices (204, 206) can be implemented as general purpose computers (such as personal computers), portable computers (e.g., laptop computers, mobile telephone devices, various kinds of wearable computers, etc.), and so forth. Or the user devices (204, 206) can refer to functionality that is integrated in an application-specific device, such as a game console (such as Microsoft Corporation's Xbox™ game console, produced by Microsoft Corporation of Redmond, Wash.), a set-top television box, and so forth. Or the user devices (204, 206) can refer to units specifically designed to send and transmit messages. In any case, the user devices (204, 206) can include any combination of computer hardware and logic functionality, including one or more processors, RAM memory, ROM memory, one or more media drives, one or more storage units, one or more input devices, and so on. FIG. 6 describes exemplary software components of the user devices (204, 206), while FIG. 12 describes exemplary hardware components of the user devices (204, 206).

The coupling mechanism 208 can include any kind of routing infrastructure or combination of routing infrastructures. For instance, the coupling mechanism 208 can include any combination of wide area network, local area network, point-to-point connectivity, and so on. In one example, the coupling mechanism 208 employs some kind of network that utilizes the TCP/IP protocol, such as the Internet, and/or an intranet, etc. In this protocol, messages are transmitted in packets over a network infrastructure that potentially includes various routers, gateways, name servers, etc. (not shown). But the coupling mechanism 208 can also employ other kinds of networks, such as local area Ethernet networks, and so on. The communication links employed by the coupling mechanism 208 can include any combination of hardwired links, wireless links, etc.

The system 200 generally includes various servers devoted to the task of facilitating the exchange of IM information, of which the switchboard 212 is only one component. In the context of system 200, the switchboard 212 serves the purpose of exchanging setup information between user device A 204 and user device B 206. The head-end infrastructure also includes connection server 214 and connection server 216 (these being merely illustrative, as the head-end infrastructure will typically provide more than two connection servers). When user device A 204 first logs on, it connects to connection server 214. Similarly, when user device B 206 logs on, it connects to connection server 216. The connection servers (214, 216) serve the role of facilitating the preparatory exchange of control information in the manner described below.

As well understood in the art, "servers" generally refer to computer devices configured to deliver functionality to other devices using a client-server mode of interaction. The server computers can include any combination of computer hardware and logic functionality, including one or more processors, RAM memory, ROM memory, one or more media drives, one or more storage units, one or more input devices, and so on.

An overview of the operation of the system 200 is provided as follows. Assume, for the purposes of illustration, a scenario in which user A opens a conversation with user B. The preferred implementation of the system 200 is to establish the direct coupling channel 210 as soon as the conversation starts, or, in other words, as soon as user A opens a user interface (UI) panel in which to exchange IM information with user B.

In the system 200 of FIG. 2, the first task in the setting up the direct channel 210 is to set up a preparatory switchboard coupling channel 218, whereby both user device A 204 and user device B 206 can exchange setup information via the switchboard 212. There are different ways that the user devices (204, 206) can connect to a switchboard 212. In one case, when user A wants to start an IM conversation with user B, user device A 204 will ask the connection server 214 for the address of the switchboard 212 that it should use to connect to. The connection server 214 responds by providing user device A with the address of the switchboard 212. This address information allows user device A 204 to connect to the switchboard 212. The switchboard 212 can also lookup the connection server 216 that user device B 206 is coupled to, which allows the head-end infrastructure to also notify user device B 206 of the address of the switchboard 212. This allows user device B 206 to also connect to the switchboard 212. This operation thereby establishes the switchboard coupling channel 218 between user device A 204 and user device B 206.

It is preferred that the system 200 then immediately set up the direct coupling channel 210 between user device A 204 and user device B. By way of broad overview, the system 200 establishes the direct coupling channel 210 by allowing the user devices (204, 206) to exchange their various connectivity information (e.g., port pairs, address information, etc.) via the switchboard coupling channel 218. When the user devices (204, 206) receive each other's connectivity information, they can then transmit IM information 202 directly between themselves without routing the IM information 202 through the switchboard 212. This is advantageous for all of the reasons identified above. For instance, this direct coupling strategy: (a) reduces the load imposed on the switchboard 212; (b) has the potential of reducing delays in the transmission of the IM information 202; and (c) has the potential of reducing errors in the transmission of the IM information 202.

Different strategies can be employed to set up the direct coupling channel 210. In one case, the system 200 can accommodate plural kinds of transport handlers that can be used to establish the direct channel 210. For example, different transport handlers can utilize any combination of the Transmission Control Protocol/Internet Protocol (TCP/IP), the Universal Datagram Protocol (UDP), various proprietary protocols, and so forth. Selection functionality (not shown) can be employed to weigh different criteria and to select the transport handler that is best suited to provide the direct coupling channel. Exemplary criteria include: (a) the bandwidth associated with different transport handlers; (b) size of the IM information 202 to be sent; (c) various costs associated with the transport handlers; (d) various privacy consequences of the use of different transport handlers; (e) various user preferences with respect to the transport handlers; (f) whether there are any intermediary network devices (e.g., network address translators, firewalls, etc.) that have a bearing on the suitability of the transport handlers; (g) whether a particular transport handler has failed between the users on a prior occasion, and so forth. Selection can be performed by computing a single score for each transport handler based on how well it satisfies the multiple criteria, and then choosing the transport handler with the best score (e.g., the lowest or highest score).

A number of different control-message exchange protocols can be used to implement the above-described selection of the best transport handler. In one protocol, a first user device can inform another user device of the types of transport handlers that it can possibly use to communicate with the other user device. The other user device can then respond by selecting one transport handler from the permitted list using the selection strategy described above. The user devices can then exchange whatever connectivity information is necessary to set up whatever transport handler has been selected.

After such exchange, the user devices can then be used to carry out the exchange of IM information 202 using the direct coupling channel 210 via the selected transport handler. Upon failure of the selected transport handler, the selection functionality described above can be again employed to select another transport handler, this time omitting the failed transport handler from the list of permissible transport handlers.

In one exemplary case, the Transport Level Protocol (TLP) can be used to facilitate the exchange of information using whatever transport handler and coupling channel (direct or switchboard) is being used. In other words, TLP sits "on top" of the selected transport handler. A TLP packet has a TLP header that includes various control information that can be used to exchange control messages between user devices. For instance, control messages can be used to verify that the selected coupling path is working properly. That is, one device can send a RAK message to another device, whereupon the other device can reply with an ACK message; this provides some assurance that the channel is working properly. RAK/ACK messages can be sent when a coupling channel is first established and thereafter at periodic intervals to make sure it is still working properly. Other information in the control message can be used to convey whether a user device permits peer-to-peer coupling.

In the course of establishing the direct coupling channel 210, the system 200 can also implement various authentication strategies. One authentication strategy involves so-called mutual (or end-to-end) authentication. Mutual authentication involves both user devices involved in the peer-to-peer communication performing authentication with respect to each other. That is user device A 204 performs authentication vis-à-vis user device B 206, and user device B 206 performs authentication vis-à-vis user device A 204. Mutual authentication can be implemented using various available mechanisms, such as mutual Transport Layer Security (TLS), or various proprietary mechanisms.

The thus-established direct coupling channel 210 can be used to transmit any kind of IM information 202. Such IM information can include conventional text IM messages, files, image information, various custom tiles used to identity the users, and so forth.

FIG. 3 shows a system 300 that is a variation of the system 200, and therefore includes many of the same components as the system 200 (as indicated by the features which share the same reference numbers as FIG. 2). In addition, the system 300 of FIG. 3 includes an echo server 302. The purpose of the echo server 302 is to allow any of the user devices (204, 206) to discover network functionality (304, 306) that has to be taken into account when setting up the direct coupling channel 210.

More specifically, FIG. 3 illustrates exemplary network devices 304 and 306. Generally, the network devices (304, 306) can represent any kind of active network devices, such as firewalls, network address translators (NATs), and so forth. The network devices (304, 306) generally provide system security for their respective client devices. Thus, the network device A 304 can provide security for the user device A 204, and network device B 306 can provide security for the user device B 206. (More generally, various network configurations are possible. In one network configuration, the network device A 304 is present, but the network device B 306 is not present. In another network configuration, the network device B 306 is present, but the network device A 304 is not present. In another network configuration, neither network devices (304, 306) are present. In a fourth network configuration, both network devices (304, 306) are present.) When present, the network devices (304, 306) can have unique network addresses, such as internet protocol (IP) addresses, whereby the network devices (304, 306) receive data bound for their respective user devices (204, 206). Network devices (304, 306) can then forward the data to their respective user devices (204, 206) by providing various security screening functions and/or address translation functions, and so forth.

As mentioned, the role of the echo server 302 is to provide information to the user devices (204, 206) regarding the nature of the network devices (304, 306) that should be taken into account when selecting and establishing the direct coupling channel 210. For example, the user device A 204 can use the echo server 302 to obtain the network address associated with the network device A 304. To achieve this result, the user device A 204 can send the echo server 302 a message. When the echo server 302 receives the message from the user device A 204, the message will include the network address of the network device A 304. In response, the echo server 302 sends the network address of the network device A 304 back to the user device A 204. The user device B 206 may obtain the network address of the network device B 306 through a similar protocol by sending a query message to the echo server 302.

Armed with information regarding the network devices (304, 306), the user devices (204, 206) can make more intelligent decisions regarding the transport handler that should be used to establish the optimal direct coupling channel 210. In other words, knowledge of the network devices (304, 306) has a bearing on the ranking of the transport handlers described above, because one such factor in the computed suitability score pertains to whether any network devices (304, 306) are present, and if so, what these devices (304, 306) might be. Also, the knowledge gained by the echo server 302 provides address information that is used to establish the direct coupling channel 210.

In summary, FIGS. 2 and 3 pertain to the case where two users (user A and user B) initially start a conversation with each other. In the event that there are only two users in the conversation, then the systems (200, 300) will attempt to open the direct coupling channel 210 to conduct the transfer of IM information 202 in peer-to-peer fashion. The systems (200, 300) will establish a peer-to-peer channel providing that the users (A and B) have previously indicated that they will allow such a direct channel, and providing that a transport handler is available that will support such a direct channel. (Note that a user might not want to establish a peer-to-peer channel with another user because this operation will directly expose the user device's address to the other user.) If so permitted, the preferred implementation is to establish the direct coupling channel as soon as possible, that is, as soon as one user opens a conversation panel to communicate with another user.

The systems (200, 300) must provide some mechanism to handle the introduction of additional user devices, whereupon the resultant conversation will include more than two user devices. One possibility envisioned by the inventors is to establish a multi-party peer-to-peer session. This can be performed in various ways, such as by providing a mechanism whereby all of the participants to the conversation exchange address information with each other. Thereafter, each participant in the conversation can essentially broadcast its IM information to the other members in the conversation in direct manner, e.g., without requiring the routing services of the switchboard 212. Or one of the participants can be assigned the role of pseudo-switchboard; in this role, it can receive any message transmitted by a participant, and broadcasts it out to the other participants. Conversation members can gain access to other peer members' connectivity information using various peer-to-peer discovery strategies, such as PASTRY-related techniques (note, for instance, A. Rowstron and P. Druschel, "Pastry: Scalable, Distributed Object Location and Routing for Large-Scale Peer-To-Peer Systems," 18th FIFP/ACM International Conference on Distributed Systems Platforms, Heidelberg, Germany, November 2001), CHORD-related techniques (note, for instance, I. Stoica, R. Morris, D. Karger, M. F. Kaashoek, and H. Balakrishnan, "Chord: a Scalable Peer-To-Peer Lookup Service for Internet Applications," ACM SigComm 2001, San Diego, Calif., USA, August 2001), CAN-related techniques (note, for instance, S. Ratnasamy, P. Francis, M. Handley, R. Karp, and S. Shenker, "A Scalable Content-Addressable Network," ACM SigComm 2001, San Diego, Calif., USA, August 2001), and so forth.

FIG. 4 shows a system 400 that adopts another strategy. In FIG. 4, the introduction of another user device C 402 will prompt the system 400 to switch from the direct peer-to-peer channel of FIGS. 2 and 3 to the switchboard coupling channel 404 of FIG. 4. More specifically, the system 400 will detect a request to add another user device C 402 in the conversation. The system 400 will then switch to the switchboard coupling channel 218 upon the introduction of the new user device C 402. A switchboard coupling channel 218 was initially established (as shown in FIG. 2) to accommodate the transfer of control information between user device A 204 and user device B 206. If this channel 218 still exists, the system 400 will use this channel 218 as the switchboard coupling channel to transfer the IM information 202 upon the introduction of the third user device C 402. However, the previous switchboard coupling channel 218 may have been shut down to make more efficient use of switchboard 212's resources. If so, upon the introduction of the third user device C 402, the system 400 will re-establish the switchboard coupling channel 218. The system 400 will thereafter transfer IM information 202 via the switchboard channel 218, meaning that the switchboard 212 now plays a role in routing IM information 202 among participants of the conversation.

Assume, next, that any of the three user devices (204, 206, 402) in FIG. 4 leaves the conversation, restoring the conversation to two participants. Once again, the system 400 can handle this situation in different ways. The preferred way of handling this event is to switch back to the direct coupling channel 210 if this channel 210 is still active. But the system 400 will still use the switchboard channel 218 if the direct coupling channel 210 has been shut down. However, it is also possible to re-establish the direct coupling channel 210 in the event that it has been shut down.

The graceful switching between the direct coupling channel 210 and the switchboard coupling channel 218 provides numerous benefits. The lion share of activity in the system 400 results from conversations involving only two people. Thus, the system 400 can devote the majority of its resources to efficiently handling these conversations, that is, by efficiently setting up the direct coupling channel 210. In the event that another user device 402 joins the conversation, then the system 400 can fall back on the switchboard coupling channel 218, without having to perform the potentially more complex establishment and maintenance of a multi-party peer-to-peer conversation. Because multi-party conversations are not prevalent, the use of the switchboard coupling channel 218 will not unduly occupy the switchboard 212's resources, and will therefore not unduly degrade the performance of the system 400.

Finally, FIG. 5 shows a system 500 that involves the transmission of IM information 502 from user device A 504 to user device B 506 via coupling mechanism 508, but, in this case, without the preparatory set up role performed by a switchboard 212 (shown in FIG. 2, but which is omitted from FIG. 5). In other words, this system 500 does not require the use of the switchboard 212 to establish the direct coupling channel 510 when either of the user devices (504, 506) opens a conversation window; the system 500 can establish this connection 510 without the use of the switchboard 212.

To function in the above-described manner, the user devices (504, 506) of system 500 must obtain connection information which allows them to connect with each other (without the use of the switchboard 212). There are different ways that a user device can obtain such connection information. In one technique, a user device can receive such connection information from a head-end server associated with the IM service at regular intervals or upon request. The IM service can protect the privacy of the connection information by making the download of such information contingent upon the pre-approval of the IM users associated with the connection information. That is, for instance, suppose that a central server maintains connection information that identifies how a user might connect to user device B 506. The central server may allow user A to obtain this information only in the event that user B has pre-authorized user A to receive this information. While this mode of interaction does require interaction with a central server (or servers), it does not require the per-conversation coupling to head-end infrastructure that is demanded by the system 200 shown in FIG. 2. In other words, user device A 504 can start a conversation with user device B 506 without having to make contact with any switchboard type entity, unlike the case of FIG. 2.

An alternative implementation can provide peer-to-peer coupling between user devices that requires even less interaction with head-end infrastructure (and possibly no interaction with head-end infrastructure) by enabling the user devices to exchange connection information with each other in peer-to-peer fashion. A number of different peer-to-peer strategies can be used to implement this feature, including the above-identified PASTRY techniques, CHORD techniques, CAN techniques, and so forth. In operation, the system 500 can accommodate the formation of user groups and the interaction among user groups in an entirely decentralized manner by coupling the users together via the above-described peer-to-peer strategies.

A.2. Exemplary User Device Configuration

FIG. 6 shows an exemplary composition of the user device A 204 introduced in FIG. 2. As mentioned above, the user device A 204 can correspond to any kind of electronic device, including a general purpose computer (e.g., a PC), a special purpose computer, a game console computer, a portable computer, a cell phone, and so forth. In any event, the user device A 204 will include a processing device 602 coupled to a presentation device 604. The processing device 602 will generally include any combination of computer hardware and logic functionality, including one or more processors, RAM memory, ROM memory, one or more media drives, one or more storage units, one or more input devices, and so on. FIG. 12 describes exemplary hardware components of the user device 204 A.

The presentation device 604 can comprise any device for interacting with the user. It preferably comprises a display device of some nature, such as a CRT-type device, an LCD-type device, and so forth. But it can also include an audible output device, a printer-type output device, and so forth. In the event that the presentation device 604 comprises a display-type device, it can present user-interface panels (e.g., window-type displays) used by the users to conduct conversations via the IM system.

FIG. 6 shows an exemplary IM user interface presentation 606 that is activated when the user logs onto the IM service. The user interface presentation 606 includes a first section 608 which indicates that the IM user, Alice, who is interacting with the presentation 606, is online. The user interface presentation 606 includes a second section 610 which identifies each of the members that belong to Alice's IM group. In this case, the user, Alice, has defined several different IM groups, one devoted to Alice's friends, one devoted to Alice's co-workers, and so on. In conventional fashion, the IM user, Alice, can initiate a conversation with any member in the IM group list by clicking on the name of the group member. This prompts the activation of a separate conversation user interface box (not shown) in which the IM user can type her message to the selected IM group member. Transmission of this message prompts another pop-up conversation box to appear on the selected IM group member's device. To repeat, the goal of the peer-to-peer coupling strategies described herein is to establish the direct coupling channel 210 when the user clicks on the name of a group member, prompting the display of a conversation window box.

The user interface presentation 606 can also include a hypertext link ("E-mail inbox") 612 that allows the IM user, Alice, to activate a separate E-mail service via the user interface presentation 606.

FIG. 6 also shows exemplary messenger-related functionality 614 that allows the user device 204 to function in the above-described manner. The messenger-related functionality 614 can be implemented as software, firmware, or a combination of software and firmware. FIG. 6 shows the case where the functionality 614 is physically incorporated into the user device A 204 itself (e.g., as implemented by machine-readable instructions stored in one or more media devices provided by the user device A 204). However, one or more of the functions described herein can be implemented elsewhere; for instance, one or more functions can be provided by head-end functionality.

The messenger-related functionality 614 includes feature-related functionality 616 in cooperation with communication-related functionality 618. The feature-related functionality 616 is responsible for handling different facets of the IM service. For instance, an IM service can allow a user to communicate in different ways with another user, such as by exchanging textual IM messages with another user, files with another user, images with another user, and so forth. Each one of these separate facets is regarded as a feature herein.

More specifically, according to one exemplary and non-limiting implementation, the creation of a conversation panel will prompt the messenger-related functionality 614 to create a master communication session. Within that master communication session, the user can invoke different feature sessions. For example, when the user wants to send another user a text file, the user will invoke the file transfer feature, prompting the messenger-related functionality 614 to establish a feature session to accomplish the file transfer. Upon receiving a feature-specific invitation from user device A 204, the target device will apply registration functionality to also invoke a corresponding feature session on its machine. The '575 application provides further information regarding the creation of feature sessions.

The communication-related functionality 618 generally performs all functions which allow the user device A 204 to communicate with user device B 206 (or other user devices). One such function allows the user device A 204 to initially set up one or more coupling channels with user device B 206. This may involve the user device A 204 initially establishing a connection with the switchboard 212, followed by the direct coupling channel 210 (in the case of FIG. 2), or establishing the direct coupling channel 510 without requiring a preparatory switchboard coupling channel 218 (as in the case of FIG. 5). The selection of the direct coupling channel 210 may involve any number of handler selection operations, which were set forth above. To summarize, the user device A 204 can form a list of possible transport handlers that it can use to establish a direct coupling channel with the user device B 206, and then forward this list to the user device B 206. This will prompt user device B 206 to select one transport handler from the list and communicate that selection back to the user device A 204. User device B 206 can make this selection based on its ranking of preference-related scores in the manner described above. Alternatively, the user device A 204 may respond to a list of transport handlers forwarded to it by user device B 206; in this case, user device A will perform the selection operations described above.

Once the direct coupling channel 210 has been set up, the communication-related functionality 618 performs the tasks of sending IM information 202 over the direct coupling channel 210 (or channel 510). This can involve packaging the IM information 202 into packets to suit whatever transport handler is being used.

The communication-related functionality 618 also performs the task of coordinating switchover from the direct coupling channel 210 to the switchboard coupling channel 218, and vice versa. The communication-related functionality 618 will switch over to the switchboard coupling channel 218 when the number of participants in a conversation exceeds two. The communication-related functionality 618 will switch back to the direct coupling channel 210 when the number of participants in a conversation is restored to two, and providing that the direct coupling channel 210 is still active (else, the communication-related functionality 618 will maintain the switchboard coupling channel 218).

Figure 7:
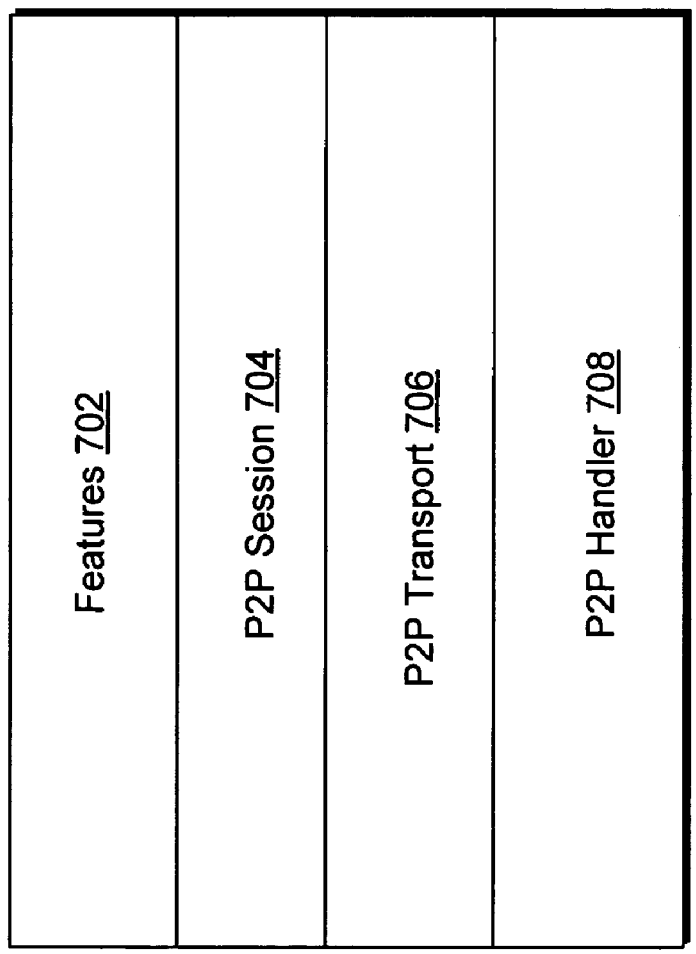
FIG. 7 shows an exemplary protocol stack for implementing aspects of the transmission of IM information using the direct coupling channel.

As shown in FIG. 7, the above-described functionality can be implemented as a protocol stack 700. At the top of the stack is feature-related protocol layer 702. This protocol layer pertains to the behavior of the feature-related functionality described above. Underneath the feature-related protocol layer are various P2P-related protocol layers (704-708). The feature-related protocol layer 702 is abstracted from the underlying P2P communication layers, such that the feature-related protocol layer 702 does not need to "know" what is necessarily taking place in the underlying layers. It can simply make API-related calls to the underlying P2P layers without having to expressly take account for whatever configurations have been selected in the underlying P2P layers (such as what transport handler has been selected).

As to the P2P-related layers, a P2P session layer 704 defines the main object of transport API. All end-user features interact with the P2P session layer 704. More specifically, this layer 702 encapsulates the concept of the conversation between peers and exposes methods to send and receive data among peers. The P2P transport layer 706 handles the actual transmission of the P2P session traffic from one user device to another user device via particular transport handling functionality. Among other duties, the P2P transport layer 706 can perform the score-based selection of transport handlers in the manner described above. The transport handler layer 708 pertains to the actual transport handlers that a user device can employ to form a P2P connection with another user device.

B. Exemplary Method of Operation

Figure 8:
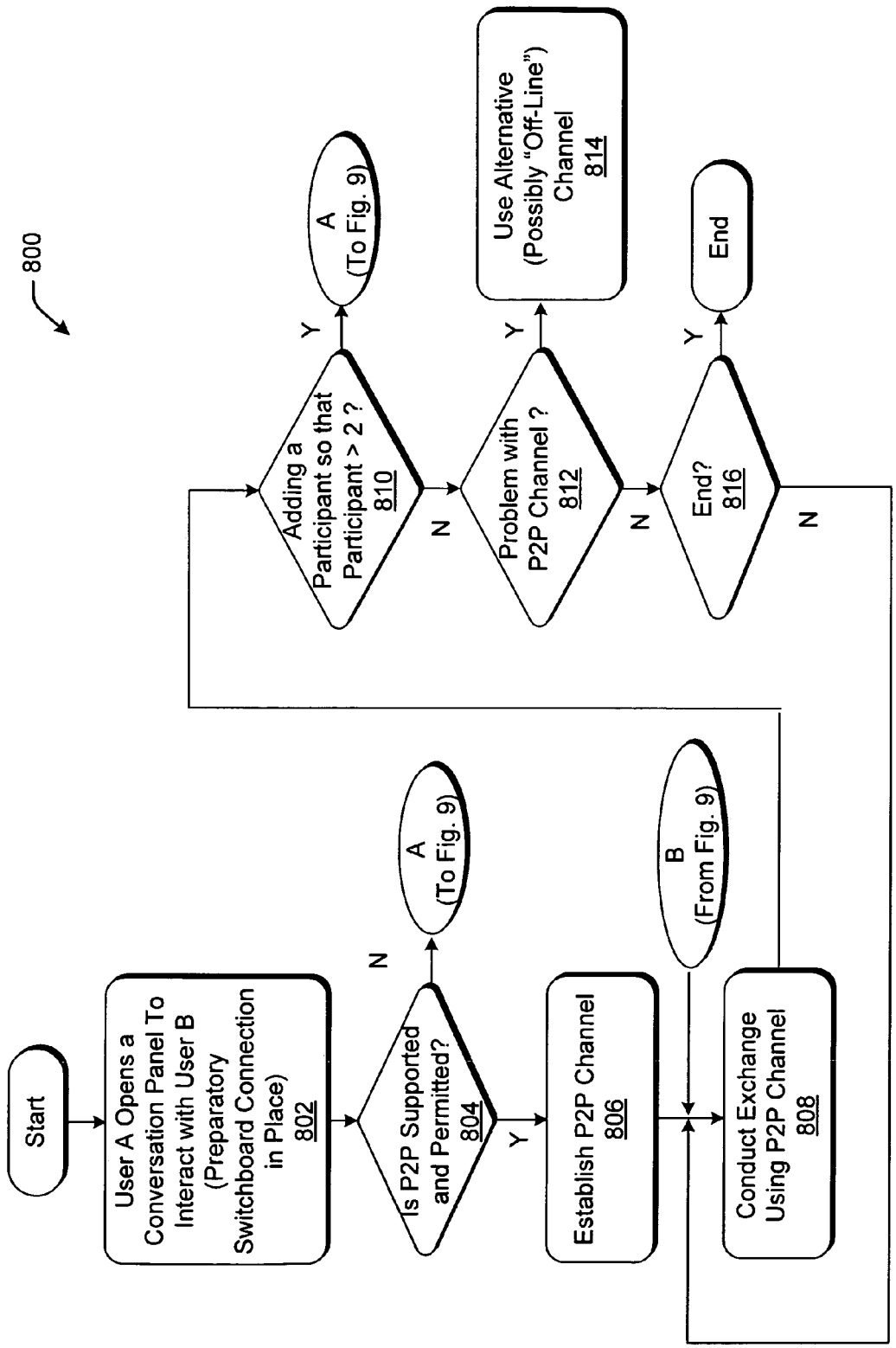
FIGS. 8 and 9 show an exemplary flowchart that explains one manner of transitioning between the direct channel coupling and the switchboard channel coupling.
Figure 9:
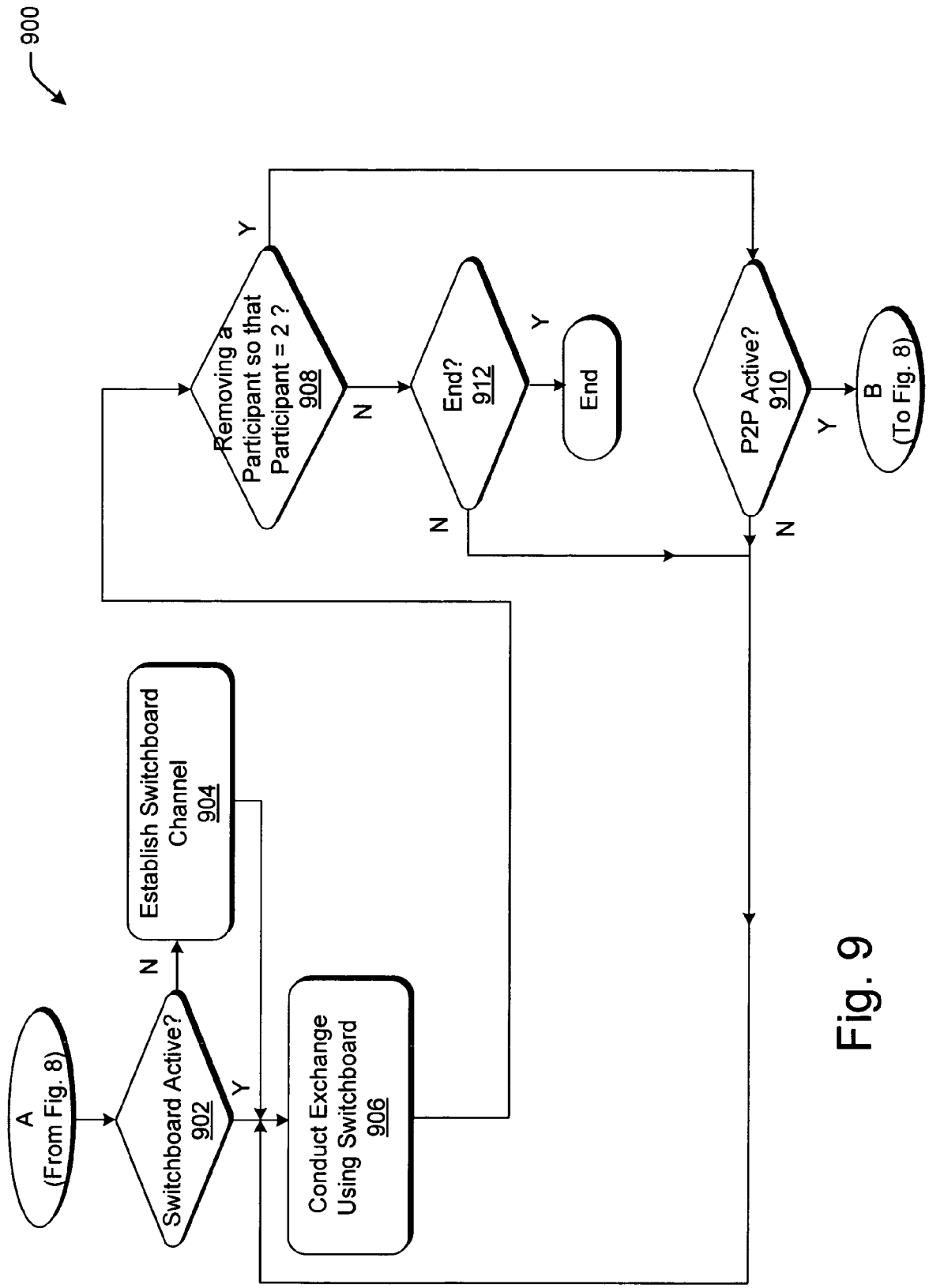

FIGS. 8 and 9 together describe the operation of the systems of FIGS. 2-4 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

Beginning with the procedure 800 of FIG. 8, step 802 entails the user A opening a conversation panel with the user B in order to exchange IM information 202 with the user B (where, in the case of the system 200 of FIG. 2, the preparatory switchboard coupling channel 218 has been established). The goal of the P2P strategies described herein is to set up the direct coupling channel 210 as soon as this panel is opened. To this end, step 804 entails determining whether a P2P connection is: a) supported; and b) permitted. For instance, a P2P connection may not be supported in certain circumstances where active network functionality precludes such a connection, where there are more than two participants in the conversation, or due to some other factor. A P2P connection may not be permitted in those circumstances where either user A or user B has previously indicated that they do not wish to conduct a P2P connection with each other. These users may have opted out of such a connection because they do not wish other parties to discover their connectivity information (e.g., IP address information, port information, etc.). Users may indicate whether they wish to allow or preclude P2P connection on a global basis, by allowing or prohibiting P2P communication with all users; or users may make such selection by allowing or precluding P2P communication with respect to specific identified users (but not other users). The permissibility of P2P connection can be captured by allow lists maintained by each user device (204, 206), and conveyed in control information passed between the user devices (204, 206). In the event that a P2P connection is not supported or permitted, the flow advances to FIG. 9, which involves the use of a switchboard coupling channel instead of a P2P coupling channel.

Provided that a P2P connection is supported and permitted, step 806 is invoked, which entails setting up the direct coupling channel 210. This can involve all of the selection steps outlined in Section A. For instance, user device A 204 can form a list of permitted transport handlers that it can use to establish the direct coupling channel 210. User device B 206 can select one transport handler from the list using the score-based ranking scheme described above. User device B 206 can forward this selection to user device A 204. This information contains the necessary connectivity information to set up the direct coupling path 210. Thereupon, the user devices (204, 206) can establish the direct coupling channel 210.

Following the establishment of the direct coupling channel 210, step 808 entails using the channel to transmit IM information between user device A 204 and user device B 206. This IM information can include textual IM messages, as well as other kinds of data.

Step 810 determines whether another user device (e.g., user device C 402 of FIG. 4) has joined the conversation. If so, then the number of participants in the conversation exceeds two and the switchboard coupling channel is invoked (as will be described in FIG. 9).

Step 812 determines whether there is some problem with the P2P channel set up in step 806. This can be assessed based on RAK and ACK messages that are periodically transmitted back and forth between the participants of the P2P conversation. A failure to receive an ACK message after a user device has sent a RAK message is indicative of a failure of the communication channel. Such a failure can be attributed to various causes, such as the failure of one or more actors in the communication path (such as network address translators, firewall devices, and so forth). Or one participant in the conversation may have simply logged off and gone off-line during the course of a message exchange. In any of these events, the procedure 800 invokes step 814, which involves using an alternative communication channel. Such an alternative channel can involve another P2P transport handler, in which case the procedure 800 can continue with the other P2P transport handler. The alternative channel can also comprise the switchboard coupling channel, in which case the procedure advances to operations set forth in FIG. 9. Still alternatively, the alternative channel can comprise a so-called "off-line" channel. For instance, the IM service can format the IM information 202 into an E-mail message and transmit the E-mail message to the recipient as a conventional E-mail, instead of a real-time IM message. The recipient can receive such a message even if they are offline at the time it is sent.

Step 814 determines whether the P2P communication should continue. The procedure 800 will come to an end when either of the participants ends the conversation.

FIG. 9 shows a procedure 900 for conducting the communication session using the switchboard coupling channel 218. This procedure is invoked when the number of participants in a conversation exceeds two, or there is some difficulty with the direct coupling channel 210.

Step 902 first entails determining whether the switchboard coupling channel 218 remains active. In the systems of FIGS. 2-4, this channel 218 was first established to enable the user devices (204, 206) to exchange control information, so as to set up the direct coupling channel 210. However, the systems may have shut down this channel 218 to conserve the resources of the switchboard 212. Thus, if the switchboard coupling channel 218 has been shut down, step 904 entails re-establishing this channel 218.

Once the switchboard coupling channel 218 is active, step 906 entails conducting the IM conversation using the switchboard 212. This involves routing IM information 202 through the switchboard 212.

Step 908 determines whether a participant has left the conversation so that the number of participants is again equal to two. In this event, step 910 is invoked, which makes a determination whether the direct coupling channel 210 is still active. If so, then the flow advances back to step 808 of FIG. 8. But if the direct coupling channel 210 has been de-activated, then the procedure 900 will continue to use the switchboard coupling channel 218. In another implementation, however, the procedure 900 could re-activate the direct coupling channel 218 instead of continuing with the switchboard coupling channel 218.

Finally, step 912 determines whether the procedure 900 has come to an end. As before, the procedure 900 comes to an end when the conversation ends.

C. Exemplary Computer Environment

Figure 10:
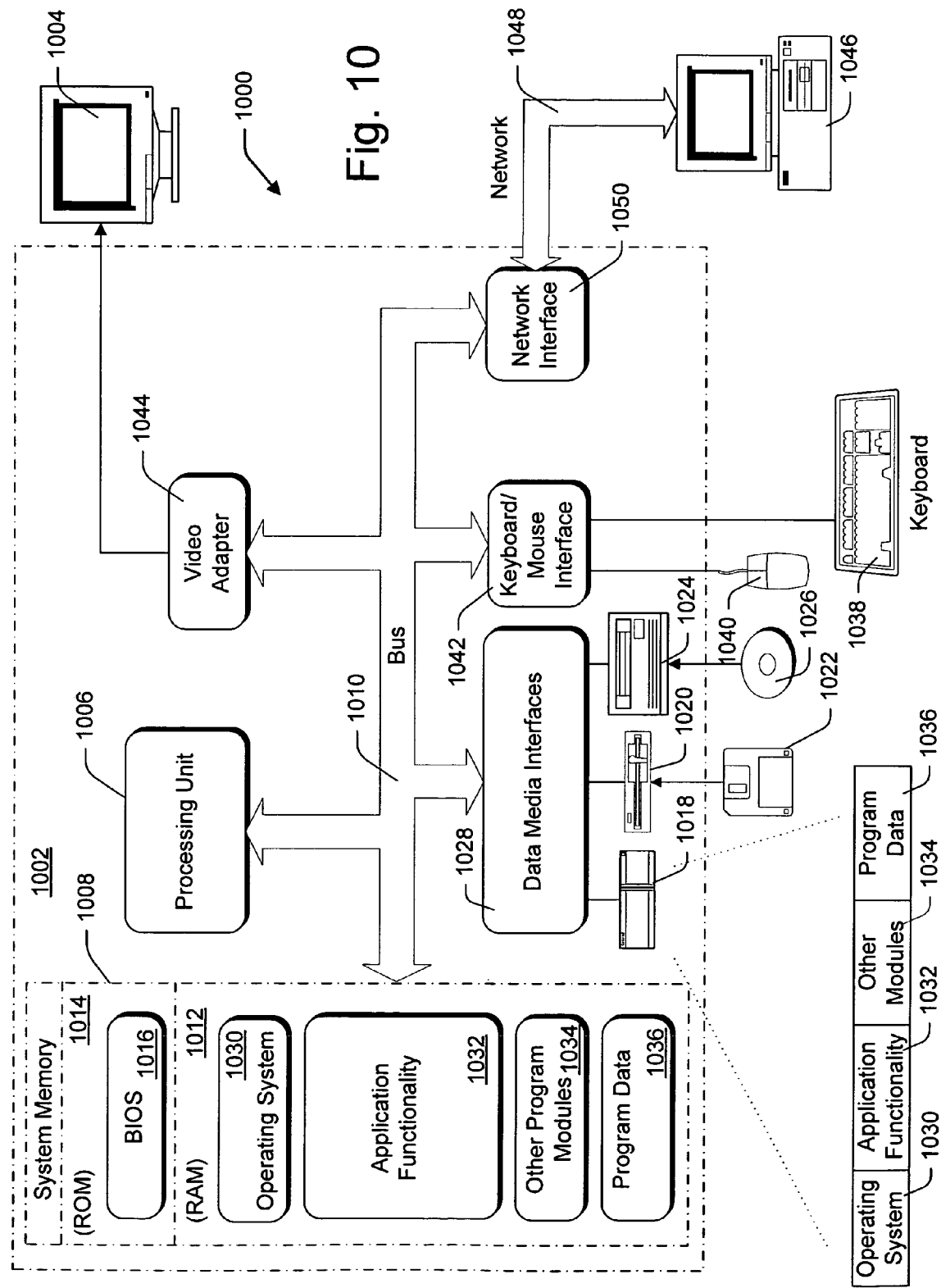
FIG. 10 shows an exemplary computer environment for implementing aspects of the systems shown in FIGS. 2-5.

In one exemplary implementation, certain aspects of the IM service functionality can be implemented as computer code executed by the participant devices (e.g., user device A 204 and user device B 206). In this case, FIG. 10 provides information regarding an exemplary computer environment 1000 that can be used to implement such message service functionality. Additionally, insofar as various head-end functionality is implemented by server-type computers, FIG. 10 also provides information regarding an exemplary implementation of any of such server computers.

The computing environment 1000 includes a general purpose or sever type computer 1002 and a display device 1004. However, the computing environment 1000 can include other kinds of computing equipment. For example, although not shown, the computer environment 1000 can include handheld or laptop devices, set top boxes, game consoles, mainframe computers, etc. Further, FIG. 10 shows elements of the computer environment 1000 grouped together to facilitate discussion. However, the computing environment 1000 can employ a distributed processing configuration. In a distributed computing environment, computing resources can be physically dispersed throughout the environment.

Exemplary computer 1002 includes one or more processors or processing units 1006, a system memory 1008, and a bus 1010. The bus 1010 connects various system components together. For instance, the bus 1010 connects the processor 1006 to the system memory 1008. The bus 1010 can be implemented using any kind of bus structure or combination of bus structures, including a memory bus or memory controller, a peripheral bus, an accelerated graphics port, and a processor or local bus using any of a variety of bus architectures.

Computer 1002 can also include a variety of computer readable media, including a variety of types of volatile and non-volatile media, each of which can be removable or non-removable. For example, system memory 1008 includes computer readable media in the form of volatile memory, such as random access memory (RAM) 1012, and non-volatile memory, such as read only memory (ROM) 1014. ROM 1014 includes an input/output system (BIOS) 1016 that contains the basic routines that help to transfer information between elements within computer 1002, such as during start-up. RAM 1012 typically contains data and/or program modules in a form that can be quickly accessed by processing unit 1006.

Other kinds of computer storage media include a hard disk drive 1018 for reading from and writing to a non-removable, non-volatile magnetic media, a magnetic disk drive 1020 for reading from and writing to a removable, non-volatile magnetic disk 1022 (e.g., a "floppy disk"), and an optical disk drive 1024 for reading from and/or writing to a removable, non-volatile optical disk 1026 such as a CD-ROM, DVD-ROM, or other optical media. The hard disk drive 1018, magnetic disk drive 1020, and optical disk drive 1024 are each connected to the system bus 1010 by one or more data media interfaces 1028. Alternatively, the hard disk drive 1018, magnetic disk drive 1020, and optical disk drive 1024 can be connected to the system bus 1010 by a SCSI interface (not shown), or other coupling mechanism. Although not shown, the computer 1002 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1002. For instance, the readable media can store the operating system 1030, application-specific functionality 1034 (including functionality for implementing aspects of the IM service), other program modules 1034, and program data 1036.

The computer environment 1000 can include a variety of input devices. For instance, the computer environment 1000 includes the keyboard 1038 and a pointing device 1040 (e.g., a "mouse") for entering commands and information into computer 1002. The computer environment 1000 can include other input devices (not illustrated), such as a microphone, joystick, game pad, satellite dish, serial port, scanner, card reading devices, digital or video camera, etc. Input/output interfaces 1042 couple the input devices to the processing unit 1006. More generally, input devices can be coupled to the computer 1002 through any kind of interface and bus structures, such as a parallel port, serial port, game port, universal serial bus (USB) port, etc.

The computer environment 1000 also includes the display device 1004. A video adapter 1044 couples the display device 1004 to the bus 1010. In addition to the display device 1004, the computer environment 1000 can include other output peripheral devices, such as speakers (not shown), a printer (not shown), etc.

Computer 1002 operates in a networked environment using logical connections to one or more remote computers, such as a remote computing device 1046. The remote computing device 1046 can comprise any kind of computer equipment, including a general purpose personal computer, portable computer, a server, etc. Remote computing device 1046 can include all of the features discussed above with respect to computer 1002, or some subset thereof.

Any type of network 1048 can be used to couple the computer 1002 with remote computing device 1046, such as the WAN 402 of FIG. 4, a LAN, etc. The computer 1002 couples to the network 1048 via network interface 1050 (e.g., the interface 416 shown in FIG. 4), which can utilize broadband connectivity, modem connectivity, DSL connectivity, or other connection strategy. Although not illustrated, the computing environment 1000 can provide wireless communication functionality for connecting computer 1002 with remote computing device 1046 (e.g., via modulated radio signals, modulated infrared signals, etc.).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for transmitting IM information to participants of an instant messaging system, comprising:
   commencing a conversation between a first user and a second user;
   automatically establishing, in response to the commencing, a direct coupling channel between the first user and the second user; and
   conducting the exchange of IM information between the first user and the second user using the direct coupling channel;
   wherein the establishing of the direct coupling channel between the first user and the second user involves querying an echo server to determine a nature of any intermediary functionality involved in the direct coupling of the IM information between the first user and the second user;
   wherein the establishing of the direct coupling channel involves selecting a transport handler for implementing the direct coupling channel that meets prescribed criteria;
   wherein the selecting of the transport handler involves computing a score for each of a plurality of transport handlers based on plural criteria, and selecting a transport handler having the best score.

2. The method of claim 1, wherein the commencing of the conversation between the first user and the second user involves establishing a preparatory switchboard coupling channel between the first user and the second user.

3. The method of claim 1, wherein the commencing of the conversation between the first user and the second user does not involve establishing a preparatory switchboard coupling channel between the first user and the second user.

4. The method of claim 1, wherein the establishing of the direct coupling channel between the first user and the second user involves performing mutual authentication in which the first user performs authentication with respect to the second user, and the second user performs authentication with respect to the first user.

5. The method of claim 1, wherein the IM information includes at least textual IM messages.

6. The method of claim 1, comprising:
adding at least a third user to the conversation; and
switching from the direct coupling channel to a switchboard coupling channel, wherein the switchboard coupling channel provides a means for communicatively coupling the first user, the second user and the third user;
wherein the switching from the direct coupling channel to the switchboard coupling channel involves establishing the switchboard coupling channel if the switchboard coupling channel is not active at the time that the third user joins the conversation.

7. The method of claim 1, comprising:
adding at least a third user to the conversation; and
switching from the direct coupling channel to a switchboard coupling channel, wherein the switchboard coupling channel provides a means for communicatively coupling the first user, the second user and the third user;
wherein the switching from the direct coupling channel to the switchboard coupling channel involves using an existing switchboard coupling channel if there is such an existing switchboard coupling channel at the time that the third user joins the conversation.

8. The method of claim 1, comprising:
adding at least a third user to the conversation;
switching from the direct coupling channel to a switchboard coupling channel, wherein the switchboard coupling channel provides a means for communicatively coupling the first user, the second user and the third user;
removing at least one participant to the conversation, again leaving only two users in the conversation; and
switching from the switchboard coupling channel to the direct coupling channel if the direct coupling channel remains active when the participant is removed, and maintaining the use of the switchboard coupling channel if the direct coupling channel has been de-activated when the participant is removed.

9. The method of claim 1, comprising:
using acknowledgement messages transmitted between the first user and the second user to assess the state of the direct coupling channel; and
using an offline information transmission route to send the IM information between the first user and the second user in the event that the use of the acknowledgement messages reveals that there has been a failure in the direct coupling channel between the first user and the second user.

10. A system for transmitting IM information to participants of an instant messaging system, comprising:

logic configured to commence a conversation between a first user and a second user;
logic configured to establish, in response to the commencing, a direct coupling channel between the first user and the second user; and
logic configured to exchange IM information between the first user and the second user using the direct coupling channel;
wherein the logic for establishing the direct coupling channel includes selection logic configured to select a transport handler for implementing the direct coupling channel that meets prescribed criteria;
wherein the logic for selecting the direct coupling channel is configured to compute a score for each of a plurality of transport handlers based on plural criteria, and to select a transport handler having a best score;
wherein the logic for establishing the direct coupling channel between the first user and the second user is configured to query an echo server to determine the nature of any intermediary functionality involved in the direct coupling of IM information between the first user and the second user.

11. The system of claim 10, wherein the logic for commencing the conversation between the first user and the second user is configured to establish a preparatory switchboard coupling channel between the first user and the second user.

12. The system of claim 10, wherein the logic for commencing the conversation between the first user and the second user is configured to not involve establishing a preparatory switchboard coupling channel between the first user and the second user.

13. The system of claim 10, wherein the logic for establishing the direct coupling channel between the first user and the second user includes authentication logic configured to perform mutual authentication in which the first user performs authentication with respect to the second user, and the second user performs authentication with respect to the first user.

14. The system of claim 10, wherein the IM information includes at least textual IM messages.

15. The system of claim 10, further comprising:
logic configured to add at least a third user to the conversation; and
logic configured to switch from the direct coupling channel to a switchboard coupling channel, wherein the switchboard coupling channel provides a means for communicatively coupling the first user, the second user and the third user;
wherein the logic for switching from the direct coupling channel to the switchboard coupling channel is configured to establish the switchboard coupling channel if the switchboard coupling channel is not active at the time that the third user joins the conversation.

16. The system of claim 10, further comprising:
logic configured to add at least a third user to the conversation; and
logic configured to switch from the direct coupling channel to a switchboard coupling channel, wherein the switchboard coupling channel provides a means for communicatively coupling the first user, the second user and the third user;
wherein the logic for switching from the direct coupling channel to the switchboard coupling channel is configured to use an existing switchboard coupling channel if there is such an existing switchboard coupling channel at the time that the third user joins the conversation.

17. The system of claim 10, further comprising:

logic configured to add at least a third user to the conversation logic configured to switch from the direct coupling channel to a switchboard coupling channel, wherein the switchboard coupling channel provides a means for communicatively coupling the first user, the second user and the third user;

logic configured to remove at least one participant to the conversation, again leaving only two users in the conversation; and logic configured to switch from the switchboard coupling channel to the direct coupling channel if the direct coupling channel remains active when the participant is removed, and to maintain the use of the switchboard coupling channel if the direct coupling channel has been de-activated when the participant is removed.

18. The system of claim 10, further including logic configured to use acknowledgement messages transmitted between the first user and the second user to assess the state of the direct coupling channel.

19. The system of claim 18, further including logic configured to use an offline information transmission route to send IM information between the first user and the second user in the event that the use of the acknowledgement messages reveals that there has been a failure in direct coupling channel between the first user and the second user.

20. A method for transmitting IM information to participants of an instant messaging system, comprising:

commencing a conversation between a first user and a second user;

establishing a direct coupling channel between the first user and the second user;

conducting the exchange of IM information between the first user and the second user using the direct coupling channel;

adding at least a third user to the conversation; and switching from the direct coupling channel to a switchboard coupling channel, wherein the switchboard coupling channel provides a means for communicatively coupling the first user, the second user and the third user;

removing at least one participant to the conversation, again leaving only two users in the conversation; and switching from the switchboard coupling channel to the direct coupling channel if the direct coupling channel remains active when the participant is removed, and maintaining the use of the switchboard coupling channel if the direct coupling channel has been de-activated when the participant is removed;

wherein the switching from the direct coupling channel to the switchboard coupling channel involves establishing the switchboard coupling channel if the switchboard coupling channel is not active at the time that the third user joins the conversation.

21. The method of claim 20, Wherein the switching from the direct coupling channel to the switchboard coupling channel involves using an existing switchboard coupling channel if there is such an existing switchboard coupling channel at the time that the third user joins the conversation.

22. A system including logic configured to implement the method of claim 20.

\* \* \* \* \*

UNITED STATES PATENT AND TRADEMARK OFFICE
CERTIFICATE OF CORRECTION

PATENT NO. : 7,433,700 B2
APPLICATION NO. : 10/987396
DATED : October 7, 2008
INVENTOR(S) : Carmen Zlateff et al.

Page 1 of 1

It is certified that error appears in the above-identified patent and that said Letters Patent is hereby corrected as shown below:

In column 20, line 16, in Claim 10, delete "score;" and insert -- score: --, therefor.

In column 21, line 3, in Claim 17, after "conversation" insert -- ; --.

In column 22, line 24, in Claim 21, delete "Wherein" and insert -- wherein --, therefor.

Signed and Sealed this
Twenty-sixth Day of April, 2011

David J. Kappos
*Director of the United States Patent and Trademark Office*